United States Patent [19]
Sato et al.

[11] Patent Number: 5,096,136
[45] Date of Patent: Mar. 17, 1992

[54] TAPE GUIDE FOR A RECORDING TAPE CARTRIDGE

[75] Inventors: Akihiko Sato, Nagaokakyo; Sinichi Kagano, Kyoto, both of Japan

[73] Assignee: Hitachi Maxell, Ltd., Osaka, Japan

[21] Appl. No.: 515,674

[22] Filed: Apr. 26, 1990

Related U.S. Application Data

[63] Continuation of Ser. No. 305,778, Feb. 3, 1989, abandoned.

[30] Foreign Application Priority Data

Feb. 3, 1988 [JP] Japan .......................... 63-13797[U]

[51] Int. Cl.⁵ ........................................... G11B 23/087
[52] U.S. Cl. ................................................... 242/199
[58] Field of Search ........................ 242/197–200; 360/132

[56] References Cited

U.S. PATENT DOCUMENTS

| | | | |
|---|---|---|---|
| 3,934,842 | 1/1976 | Posso | 242/199 |
| 4,079,499 | 3/1978 | Bagozzi | 242/199 X |
| 4,126,283 | 11/1978 | Kawachi | 242/199 |
| 4,545,500 | 10/1985 | Yamaguchi et al. | 242/197 X |
| 4,689,702 | 8/1987 | Oishi et al. | 360/132 |

FOREIGN PATENT DOCUMENTS 0151210 6/1984 European Pat. Off. .

Primary Examiner—Daniel P. Stodola
Assistant Examiner—William G. Battista, Jr.
Attorney, Agent, or Firm—Birch, Stewart, Kolasch & Birch

[57] ABSTRACT

A tape cartridge including a top case half, bottom case half and tape guide piece each separately molded, tape guide piece having upper and lower edges on the back surface thereof provided with parallel upper and lower ribs defining recess portions so as to avoid undesired engagement with the tape wound on the hubs.

3 Claims, 7 Drawing Sheets

TAPE GUIDE FOR A RECORDING TAPE CARTRIDGE

This application is a continuation of application Ser. No. 07/305,778 filed on Feb. 3, 1989, now abandoned.

BACKGROUND OF THE INVENTION

1. Field of the Invention

The present invention relates to a recording tape cartridge, and more particularly to an improvement of a tape guide piece used in a three piece type tape cartridge wherein a top case half, a bottom case half and a tape guide piece are separately molded and they are assembled together.

2. Description of the Prior Art

An example of the three piece type tape cartridge mentioned above is shown in FIG. 1 to FIG. 3, wherein three members of a tape cardridge including a top case half 1a, a bottom case half 1b and a tape guide piece 10 are molded separately. The tape guide piece 10 has its one side (front side) with formed guide ribs 16 facing to a recording and reproducing head insertion window 6 (referred to as recording head insertion window hereinafter) and guide ribs 15 and 17 facing to an erasing head insertion window 7 and a pinch roller insertion window 8 and has its other side (rear side) as defined concave portions 30 on both left and right regions The tape guide piece 10 is molded as a separate body from the top and bottom case halves 1a and 1b in order to enhance the abrasion proof property and to improve the accuracy of work of the respective guide ribs 15, 16 and 17.

As means for positioning the tape guide piece 10 relative to the top and bottom case halves 1a and 1b, there are provided bosses 27 extending in a vertical direction between the guide ribs 16 and 17 with standard positioning holes 12 defined in the respective bosses 27 so as to extend in a vertical direction and a central hole 28 defined in the top and bottom case halves 1a and 1b between the bosses 27, thereby causing the bosses 27 to be inserted in installing holes 29 which are situated at positions corresponding to the conventional positioning standard holes and causing the central hole 28 to be fitted with a screw boss 22 projected on the top and bottom case halves 1a and 1b, so that the tape guide piece 10 is regulated in terms of position in the front and rear directions and left and right directions in the cartridge.

In the conventional tape guide piece 10 mentioned above, since the parts of the tape guide piece 10 thinned by the concave portions 30 lack mechanical strength, a reinforcing rib 31 is attached only at the lower end of the concave portion 30, and moreover the thinned portions are reinforced by the bosses 27. In the contrivance of attaching the reinforcing rib 31 only to the lower end of the concave portion 30, the vertical cross sectional shape of the tape guide piece 10 becomes asymmetrical in connection with the top and bottom direction of the tape guide piece 10, whereby in molding the tape guide piece 10, the balance of the flow of the molten resin is negatively affected and there tends to occur deformation, curving, bending and torsion due to the shrinkage of the molded tape guide piece after molding.

SUMMARY OF THE INVENTION

An essential object of the present invention is to eliminate the drawbacks inherent in the prior art tape cartridge mentioned above and to provide a tape cartridge which can prevent deformation, such as bending and curving of the tape guide piece, assuring enough mechanical strength, and can improve the accuracy of the verticality of the tape guide piece so as to obtain an excellent tape running property.

In order to accomplish the object of the present invention mentioned above, the tape cartridge is provided with a tape guide piece having its upper and lower edges on the back surface provided with parallel upper and lower ribs forming recessed portions so as to avoid undesired engagement with the tape wound on the hubs.

In the arrangement mentioned above, since the cross sectional shape of the tape guide piece is symmetrical by the parallel ribs, when the tape guide piece is molded the flow of the resin can be improved, whereby deformation and bending or curving of the tape guide piece due to shrinkage after molding can be suppressed. In addition, by providing the upper and lower ribs at the upper edge and lower edge of the tape guide piece, enough mechanical strength can be assured without requiring specific bosses as used in the prior art. Therefore it becomes possible to remove the mold in a direction perpendicular to the guide ribs on the tape guide piece when molding, whereby the guide ribs can be molded with a high degree of accuracy.

DETAILED DESCRIPTION OF THE INVENTION

Figure 1:
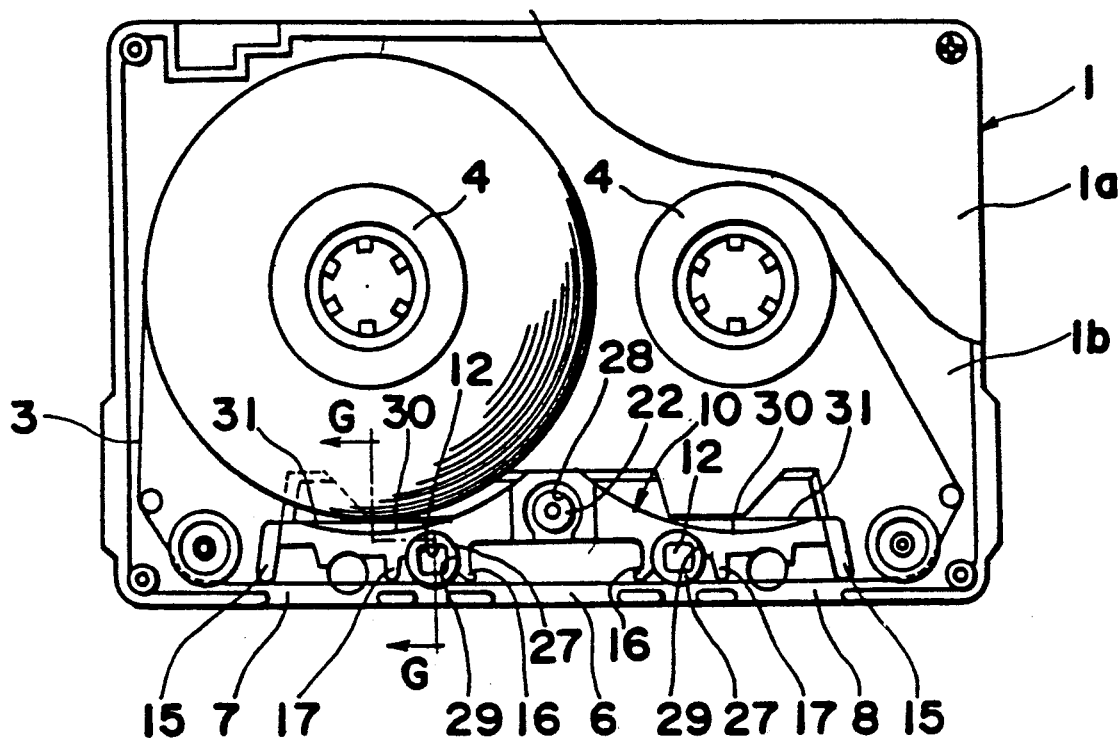
FIG. 1 is an inside plan view of a conventional tape cartridge partially cut.
Figure 3:
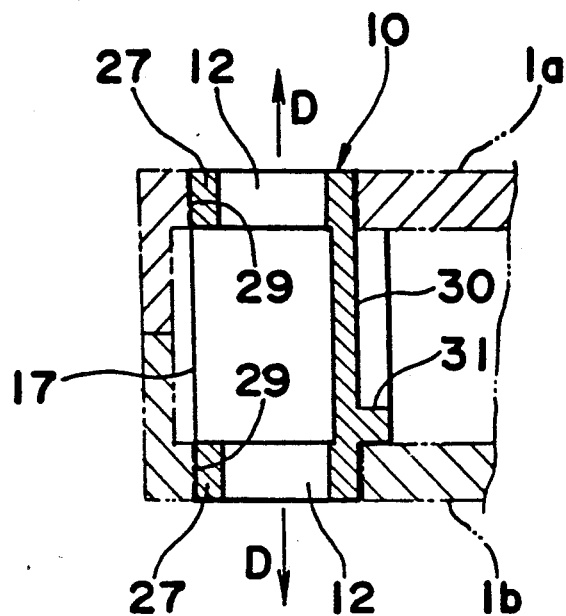
FIG. 3 is a cross sectional view taken along the lines G—G in FIG. 1.
Figure 2:
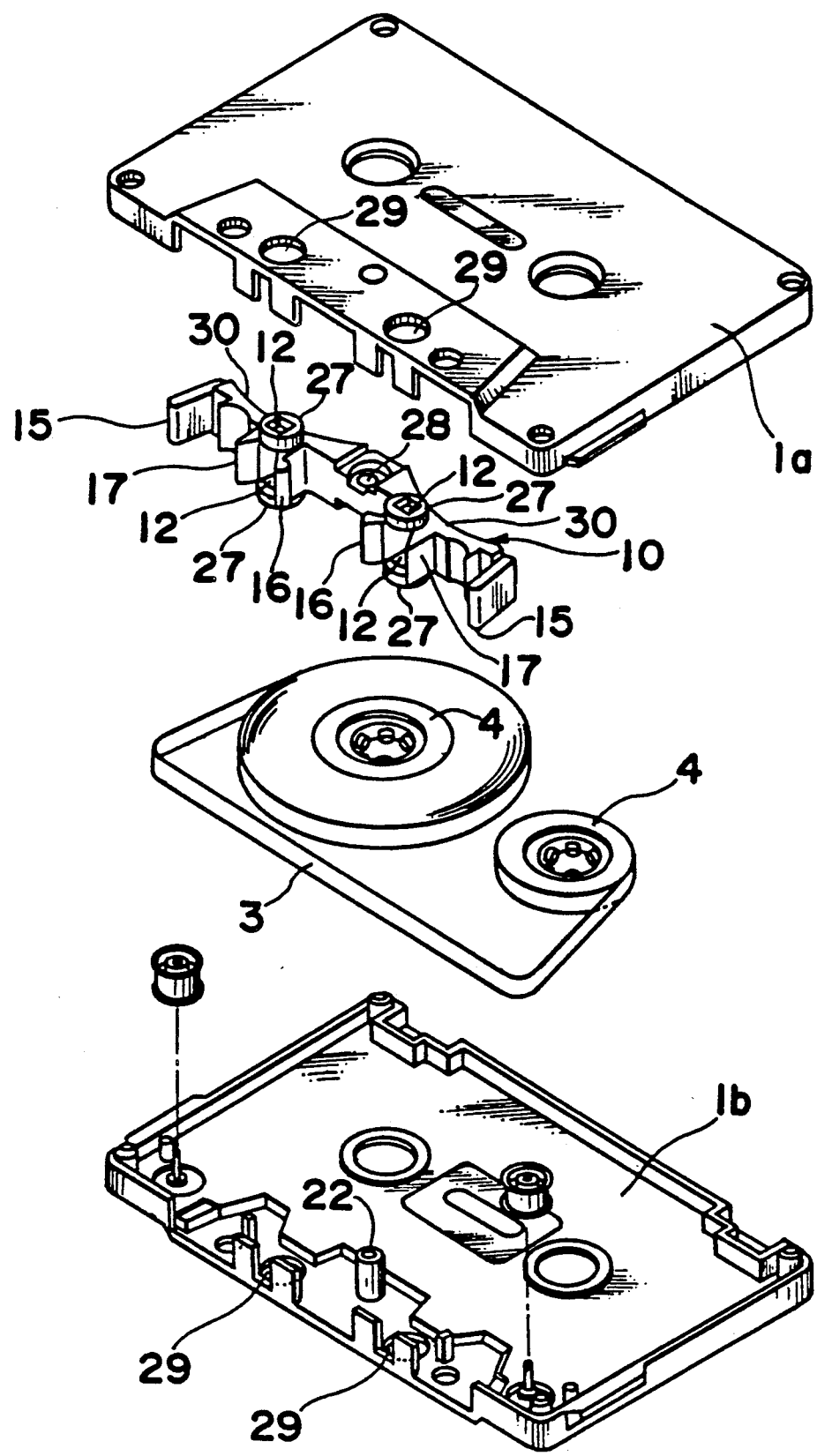
FIG. 2 is an exploded view of the tape cartridge shown in FIG. 1.
Figure 4:
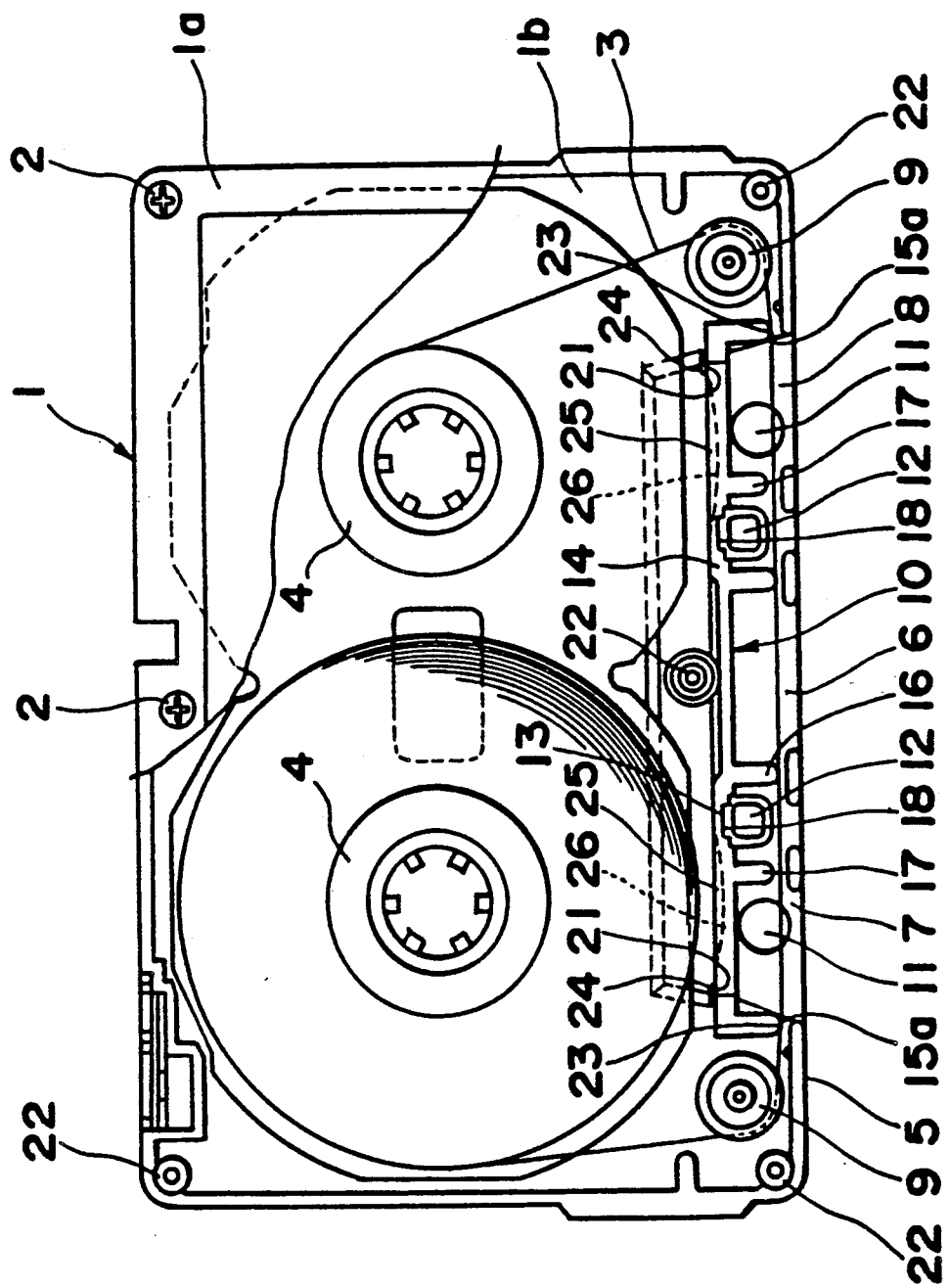
FIG. 4 is an inside plan view of an embodiment of a tape cartridge according to the present invention partially cut.

Referring to FIG. 4, a case body 1 of a tape cartridge is formed by combining a top case half 1a and bottom case half 1b made of plastic resin into one body and fastening them by fitting screws 2 in screw bosses 22 at several positions. In the left half portion and right half portion of the case body 1, a pair of hubs 4 for winding a recording tape 3 ar rotatably accommodated. The recording head insertion window 6 opens on a front wall 5 of the case body 1 at the central portion in terms of a longitudinal direction or left and right direction of the case body 1. Moreover on the front wall 5, the erasing head insertion window 7 and pinch roller insertion window 8 are open at both sides of the recording head insertion window 6. A pair of tape guide rollers 9 are rotatably disposed at the left and right hands on the front portion in the case body 1 and a tape guide piece 10 is situated between the tape guide rollers 9.

The recording tape 3 is adapted to be drawn from one of the hubs 4 toward the front of the case body 1 and advances along a tape running path between the guide rollers 9 and the front wall 5 guided by the tape guide piece 10 and taken up by another hub 4.

Figure 5:
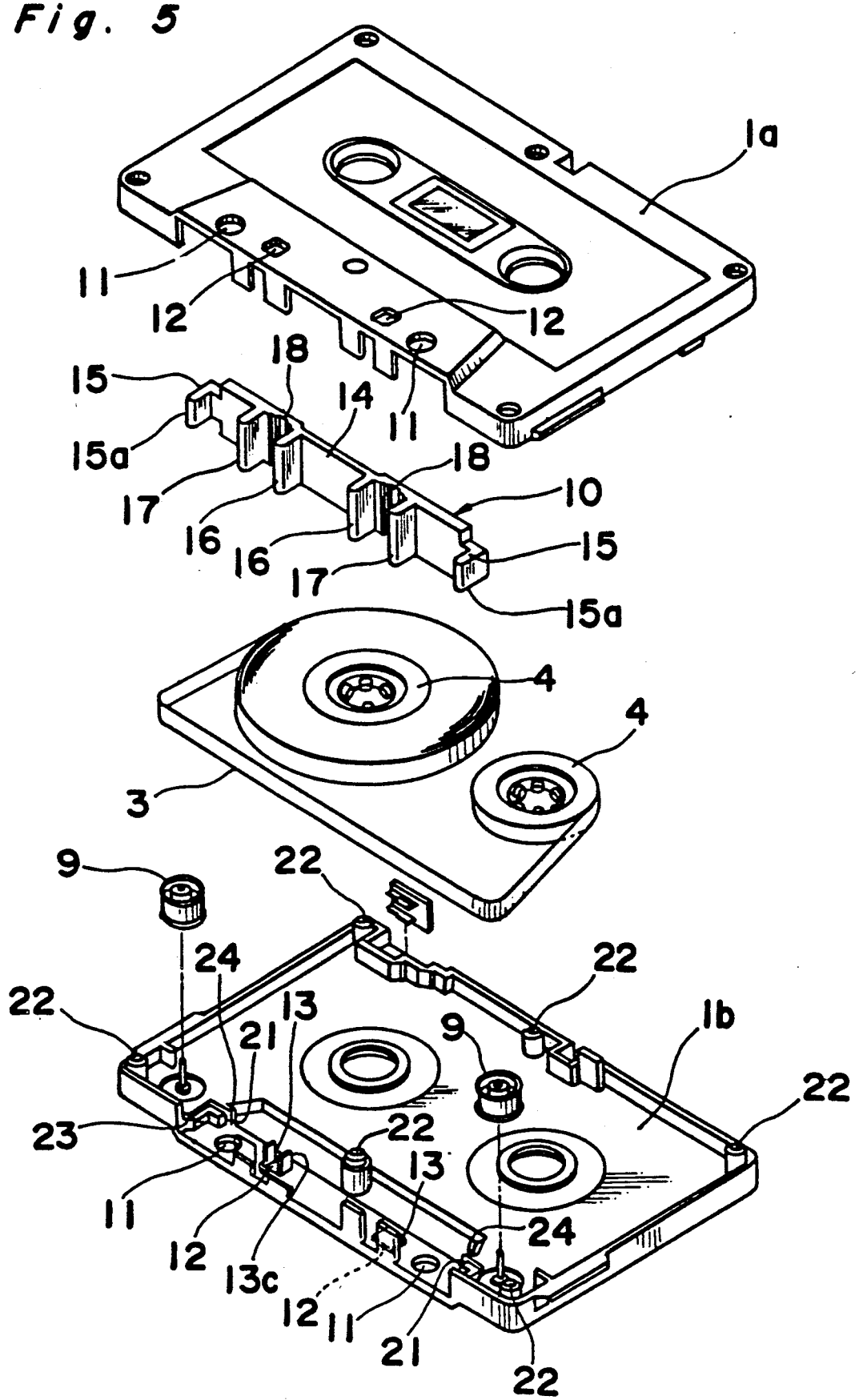
FIG. 5 is an exploded view of the tape cartridge shown in FIG. 4.
Figure 6:
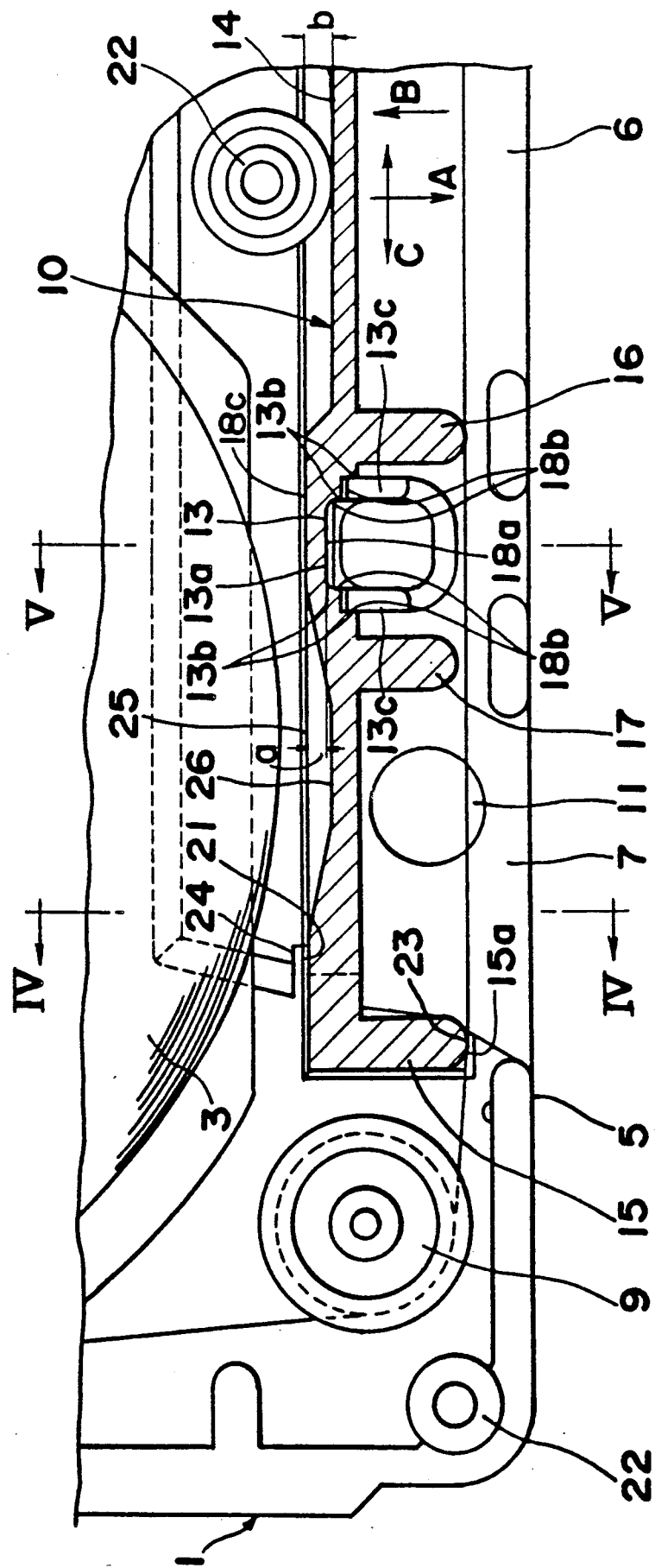
FIG. 6 is an enlarged cross sectional view showing an essential portion of the tape cartridge shown in FIG. 4.

Referring to FIGS. 5 and 6, the tape guide piece 10 is molded separately from the top case half 1a and bottom case half 1b by injection molding. The tape guide piece 10 comprises a plate like base plate 14 having the same vertical height as the inner height of the case body 1 or inner height of the top case half 1a and bottom case half 1b, a pair of first guide ribs 15 forming a pair of vertical walls and projected in a symmetric manner towards the front direction from both the left and right ends of the base plate 14, a pair of second guide ribs 16 projected symmetrically toward the front direction from a medial portion of the base plate 14 and extending in a vertical direction and a further pair of third guide ribs 17 projected toward the front direction from the base plate 14 between the first guide ribs 15 and second guide ribs 16 in a symmetrical manner, with their wall surfaces formed as vertical walls. All of the vertical guide ribs can be said to be provided on lateral portions or left and right portions of the base plate 14.

Figure 9:
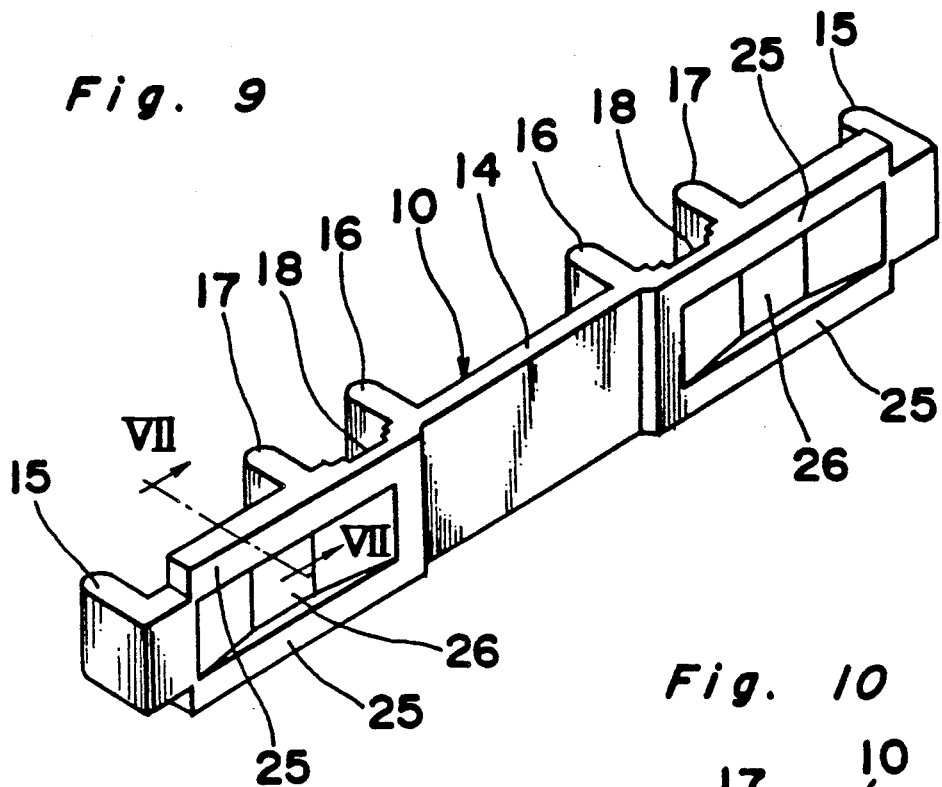
FIG. 9 is a perspective view showing a tape guide piece according to the present invention.
Figure 10:
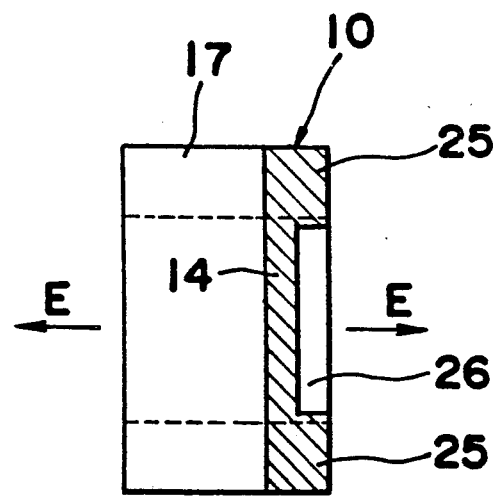
FIG. 10 is a cross sectional view taken along the lines VII—VII in FIG. 6.

Moreover, there are formed concave portions 18 between the second guide ribs 16 and the third guide ribs 17 on the front surface of the base plate 14 in a symmetrical manner with respect to the longitudinal direction of the tape guide piece 10 so as to avoid overlapping with the standard positioning holes 12. As shown in FIG. 6, each of the concave portions 18 is defined by a flat inner bottom wall 18a and side walls 18b formed so as to expand stepwise in the right and left directions from both sides of the flat inner bottom wall 18a. As shown in FIGS. 9 and 10, there are formed parallel upper and lower ribs 25 at the upper and lower edges of the back surface of the base plate 14 corresponding to the first guide ribs 15 and second guide ribs 16 and concave portions 26 are formed between the upper and lower ribs 25 in the base plate 14 so as to prevent the recording tape 3, wound on the hubs 4, from contacting the base plate 14.

Referring to FIGS. 4 and 5, there are formed in the inner surface of the top case half 1a and bottom case half 1b, capstan insertion windows 11 facing to the erasing head insertion windows 7 and pinch roller insertion windows 8, moreover, there are formed standard positioning holes 12 at the position between the recording head insertion window 6 and the erasing head insertion window 7 and a the position between the recording head insertion window 6 and pinch roller insertion window 8 for receiving a positioning pin of a recording and reproducing device.

Figure 8:
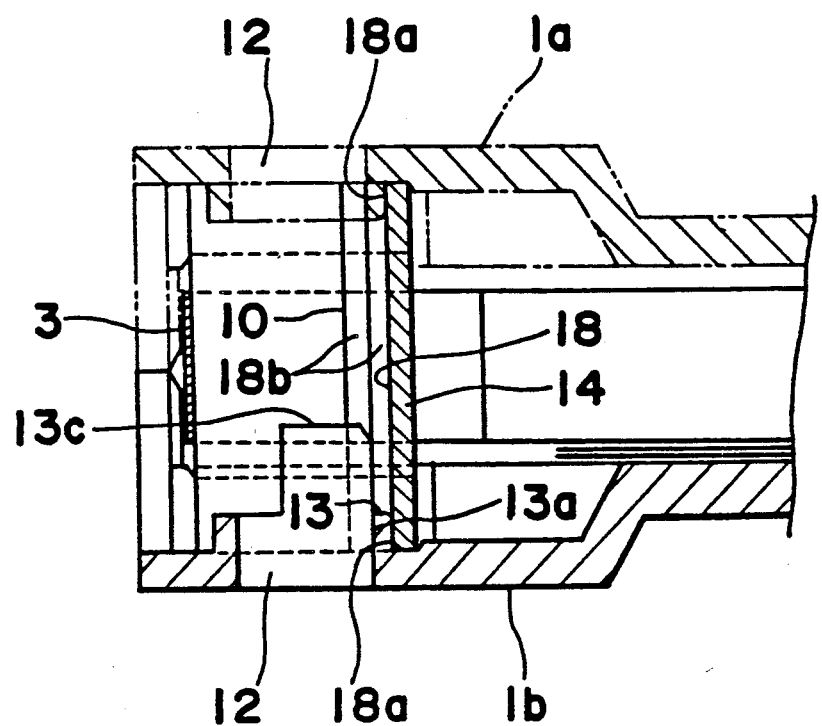
FIG. 8 is a cross sectional view taken along the lines V—V in FIG. 6.

From the inner surfaces of the top and bottom case halves 1a and 1b, projections 13 are projected at the peripheral edge portions of the standard positioning holes 12 so as to surround the standard positioning holes 12. As shown in FIGS. 6 and 8, each of the projections 13 comprises a flat back wall 13a which meets with the flat bottom wall 18a of the concave portion 18 of the tape guide piece 10 and both side walls 13b which are formed stepwise so as to meet with the stepped side walls 18b of the concave portion 18.

Figure 7:
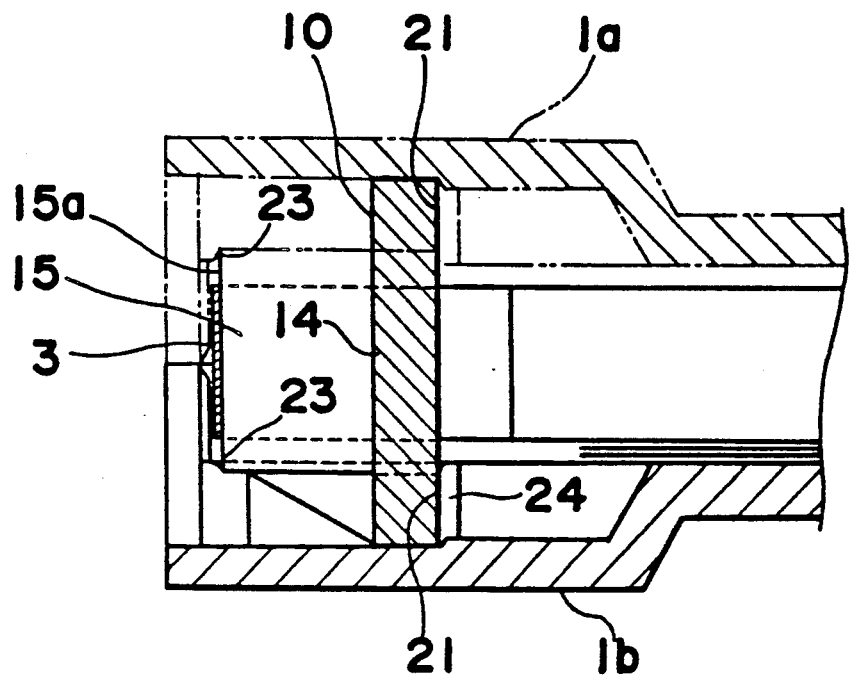
FIG. 7 is a cross sectional view taken along the lines IV—IV in FIG. 6.

As seen in FIGS. 6 and 7 there are provided further projections 24 having piece receiving walls 21, at positions nearer to the tape guide rollers 9 on the inner parts from the erasing head insertion windows 7 and pinch roller insertion windows 8 in the inside of the top and bottom case halves 1a and 1b, at positions back of and at both outer sides from the projections 13. The distance between the back surface 13a of the projection 13 and the piece receiving wall 21 is set substantially equal to the thickness between the bottom wall 18a and back surface 18c of the base plate 14 at the portion corresponding to the concave portion 18.

Moreover, there is formed in the bottom case half 1b a slanted wall 23 which rises frontwardly and is directed backward at a position in front of the piece receiving wall 21 and there is formed in the top case half 1a a further slanted wall 23 which descends frontwardly and is directed backward at a position in front of the piece receiving wall 21. The distance between the slanted walls 23 and front wall 5 is a predetermined value desired to provide the tape advancing path.

When the tape guide piece 10 is mounted in the case body 1, the lower end portion of the tape guide piece 10 is fitted in the space between the projections 13 and the piece receiving walls 21 of the bottom case half 1b and the concave portions 18 of the base plate 14 are engaged with the projections 13, causing both right and left side ends of the back surface of the base plate 14 of the tape guide piece 10 to be contacted with the piece receiving walls 21. Moreover, the lower ends of the front surfaces 15a of the first guide ribs 15 are contacted with the slanted walls 23. Under such a condition, as shown in FIGS. 6 and 8, the inner bottom walls 18a of the concave portions 18 contact with the back surfaces 13a of the projections 18 so that the position of the tape guide piece 10 is regulated in terms of the front direction A and the side walls 18b of the concave portions 18 contact with the side walls 13b of the projections 13 so that the position of the tape guide piece 10 in terms of right and left directions C is regulated. The regulation of the position of the tape guide piece 10 in the backward direction B is performed by contacting the back and right and left side ends of the tape guide piece 10 with the piece receiving walls 21, as shown in FIGS. 6 and 7. The front surfaces 15a of the first guide ribs 15 contact with the slanted walls 23, whereby the position of the first guide ribs 15 is regulated in terms of the front direction A. The regulation of the position of the tape guide piece 10 in the vertical direction is accomplished by clamping the tape guide piece 10 between the top case half 1a and bottom case half 1b, assembled together by fastening the screws 2 into the screw bosses 22, as shown in FIGS. 7 and 8. When the top case half 1a and bottom case half 1b are assembled, the top end portion of the tape guide piece 10 is fitted in the space between the projections 13 in the top case 1a and the piece receiving walls 21 and the top ends of the front surfaces 15a of the first guide ribs 15 engage with the slanted walls 23 of the top case half 1a.

It, may be possible to extend the part 13C of the projection 13 so that when the tape guide piece 10 is temporarily assembled with the bottom case half 1b, the extended projection 13C together with the screw boss 22 prevent the tape guide piece 10 from falling.

Figure 11:
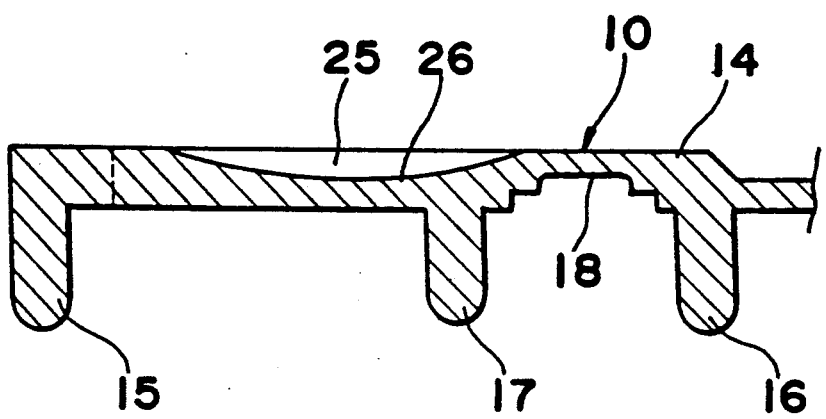
FIG. 11 is a cross sectional view showing another embodiment of a tape cartridge according to the present invention.

In place of the trapezoidal shape in the cross section of the concave portion 26 in the back portion of the ribs 25 as shown in FIG. 6, there may be used various shapes such as an arcuated shape, as shown in FIG. 11, or the like.

It is noted that by providing the upper and lower ribs 25 at the upper edge and lower edge of the tape guide piece on both sides of the concave portion 26, enough mechanical strength can be assured without the specific bosses 27 as used in the prior art, therefore it becomes possible to remove the mold in the direction E (see FIG. 10) perpendicular to the elongated direction guide ribs 15, 16 and 17, that is in the front direction, when molding the tape guide piece 10, whereby the guide ribs 15, 16 and 17 can be molded to a high degree of accuracy without effecting any draft.

As mentioned above, according to the present invention, to avoid undesired engagement with the recording tape wound on the hub, there is formed the upper and lower ribs 25 on the back surface of the tape guide piece 10 with the concave portion 26, such that the ribs 25 extend parallel along the longitudinal direction or in the left and right directions of the tape guide piece which prevents deformation of the tape guide piece by a simple manner, whereby the mechanical strength can be increased and the verticality of the guide ribs 15, 16 and 17 can be improved, resulting in improving the tape advancing property of the tape cartridge.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A tape cartridge comprising:
   a case body including a top case half and a bottom case half;
   a pair of hubs for winding a recording tape, rotatably accommodated in a left hand portion and a right hand portion of said case body;
   a chamber formed by the assembly of said top case half with said bottom case half in which a recording tape wound on said hubs can be disposed; and
   a separate and distinct tape guide piece comprised of a base plate provided within said chamber in front of said hubs of said case body, such that said entire tape guide piece is positioned radially outside of a maximum wound diameter of said recording tape which maximum diameter is defined as the diameter of a roll of recording tape when said recording tape is fully wound on one of said hubs,
   said base plate of said tape guide piece having a pair of first vertical guide ribs forming lateral walls projected in a symmetric manner towards a front of said tape cartridge from left and right ends of said base plate, a pair of second vertical guide ribs projected symmetrically towards said front of said tape cartridge from a medial portion of said base plate, and a pair of third vertical guide ribs projected symmetrically towards said front of said tape cartridge from said base plate between said first and second guide ribs, for guiding said recording tape, with concave stepped portions formed in said base plate between said second and third guide ribs on a front surface of said base plate, said base plate having formed on a back surface thereof horizontal parallel ribs at upper and lower edges of lateral portions of said base plate, said horizontal parallel ribs defining recesses within said back surface of said base plate opposite said wound recording tape, such that said fully wound recording tape will not contact said back surface of said base plate.

2. A tape cartridge assembly comprising:
   a case body including a top case half and a bottom case half;
   a pair of hubs for winding a recording tape, rotatably accommodated in a left hand portion and a right hand portion of said case body;
   a chamber formed by the assembly of said top case half and said bottom case half;
   a recording tape wound on said hubs disposed in said chamber; and
   a separate and distinct tape guide piece consisting of a base plate provided within said chamber in front of said hubs such that said entire tape guide piece is positioned outside of a maximum wound diameter of said recording tape which maximum diameter is defined as a diameter of a roll of recording tape when said recording tape is fully wound on one of said hubs,
   said base plate of said tape guide piece having a pair of first vertical guide ribs forming lateral walls projected in a symmetric manner towards a front of said tape cartridge from left and right ends of said base plate, a pair of second vertical guide ribs projected symmetrically towards said front of said tape cartridge from a medial portion of said base plate, and a pair of third vertical guide ribs projected symmetrically towards said front and said tape cartridge from said base plate between said first and second guide ribs, for guiding said recording tape, with horizontal ribs at upper and lower edges of lateral portions of said base plate, said horizontal parallel ribs defining recesses within said back surface of said base plate opposite said wound recording tape, such that said fully wound recording tape will not contact said back surface of said base plate.

3. A tape guide piece for a tape cartridge comprising:
   a base plate having a vertical height the same as an inner height of a case body of said tape cartridge,
   a pair of first vertical guide ribs forming lateral walls projected in a symmetric manner towards a front of said tape cartridge from left and right ends of said base plate,
   a pair of second vertical guide ribs projected symmetrically towards said front of said tape cartridge from a medial portion of said base plate,
   a pair of third vertical guide ribs projected symmetrically towards said front of said tape cartridge from said base plate between said first and second guide ribs,
   concave stepped portions formed in said base plate between said second and third guide ribs on a front surface of said base plate, and
   parallel upper and lower edges formed on a back surface of said base plate extending between said first and second guide ribs providing a pair of concave portions formed in said back surface of said base plate, said upper and lower edges being contiguous with said pair of first vertical guide ribs.

* * * * *